3,163,531
PHOTOCONDUCTIVE LAYERS FOR ELECTRO-
PHOTOGRAPHIC PURPOSES
Heinz Schlesinger, Wiesbaden, Germany, assignor to Azoplate Corporation, Murray Hill, N.J., a corporation of New Jersey
No Drawing. Filed May 20, 1960, Ser. No. 30,429
Claims priority, application Germany June 11, 1959
22 Claims. (Cl. 96—1)

As photoconductive layers for electrophotographic purposes inorganic substances, such as selenium and zinc oxide as well as several organic low molecular weight substances, such as anthracene, chrysene or benzidine, have already been used.

Now, photoconductive layers for electrophotographic purposes have been found, which are characterized in that they consist, at least partially, of a product obtained by the reaction of at least one organic substance carrying at least one amino group at one aromatic nucleus, and/or at one heterocycle, with acrolein and/or at least one substituted acrolein compound.

Suitable organic substances, which at one aromatic nucleus carry at least one amino group, are aromatic amines which may also carry substituents such as alkoxy, carbalkoxy, halogen, nitro groups cyano groups, and alkyl groups, such as aniline, p-phenylenediamine, 1,4-diamino-naphthalene, 2,3-diamino-naphthalene, 4-dimethylamino-aniline, 4-amino-diphenyl, 1-amino-naphthalene, 2-amino-naphthalene, 9-amino-anthracene, 2-amino-chrysene, 3-amino-pyrene, 4,4'-diaminostilbene, 2-amino-fluorene, 3-methoxy-aniline, 4,4'-diamino-3,3'-dimethoxy-diphenyl, 2-amino-anthraquinone, benzylidene-2-aminobenzhydrazide, 4-amino-terphenyl, 4-amino-diphenylamine, 1-amino-2-ethoxy-naphthalene, 1-amino-2-methyl-naphthalene, and 4,4'-dimaino-diphenyl.

Furthermore, compounds can be used which at one heterocycle carry at least one amino group and which, in addition, may carry substituents, such as alkoxy, carbalkoxy, halogen, nitro groups, cyano groups, hydroxyl groups or alkyl groups. Especially suitable are heterocycles of aromatic nature, such as, e.g. 8-amino-quinoline, 3-amino-9-ethyl carbazole, 2-amino-6-methoxy-benzthiazole, 2-phenyl-4-(3'-amino-phenyl)-quinazoline, 2,5-bis-(4'-amino-phenyl)-oxadiazole-(1,3,4), 3-(4-amino-phenyl)-5,6-diphenyl-1,2,4-triazine, 2-(4'-amino-phenyl) - 6 - methyl-benzthiazole, 2-(4'-amino-phenyl)-benzoxazole, 2-(4'-amino-phenyl) - benzimidazole, 2-(4'-amino-phenyl)-5-oxazole, 6-amino-quinazolone-(4), 1-(4'-amino-phenyl)-5 - phenyl - 1,2,3 - triazole, and 2-methyl-3-(4'-amino-phenyl)-quinazolone-(4).

As the acrolein component of the photoconductive products according to the present invention may be used acrolein and its substitution products. Suitable substituents are in particular: lower alkyl radicals, e.g. methyl, ethyl, butyl, propyl, and also halides such as fluorine, chlorine, bromine, and iodine. The following compounds may be used as acrolein components: acrolein, α-methyl-acrolein, α-ethylacrolein, crotonaldehyde, and α-chloro-crotonaldehyde.

For the production of the higher molecular weight photoconductive reaction products from amino- and acrolein components, both reactants, or mixtures of several reactants, are mixed with each other, preferably while stirring, and the composition is subsequently heated for some time with reflux, whereby higher molecular weight reaction products are formed. In order to slow down the reaction, one of the reactants may be slowly added to the other drop by drop or, as a diluent, an organic polar solvent may be added, e.g. alcohols such as methanol, ethanol or propanol, or one or both components may be dissolved in such solvent.

It is often advantageous to add acid condensing agents, e.g. an inorganic acid, such as hydrogen halide or organic acids, such as formic acid, acetic acid, propionic acid, or sulfonic acid, e.g. p-toluene sulfonic acid, or acid reacting salts, such as zinc chloride or aluminum chloride.

The reaction product often precipitates during reaction and can be separated by filtration, followed by drying. Alternatively, the reaction product is obtained by adding another solvent as a precipitant, or by evaporating the solvent or unreacted portions of the starting material.

The reaction product can be purified by a water wash and reprecipitation, e.g. by dissolving it in an organic solvent, such as methylene chloride and thereafter reprecipitating it by means of another solvent, such as petroleum ether. The reaction products can also be isolated by other known methods.

Preferably, the reaction is carried out at elevated temperatures, generally above room temperature and up to the boiling point of the acrolein components or the solvent used. Thus, there are preferably used temperatures ranging from 30 to 100° C. It may, however, be of advantage to use a higher reaction temperature, e.g. up to 200° C., preferably up to 150° C., towards the end of the reaction. The time of reaction may be between a few minutes up to 5 hours.

The reactants can be used in different molar ratios, however the preferred proportions range from 2 moles of the amino compound to 1 mole of the acrolein component to 2 moles of the acrolein component to 1 mole of the amino compound. Even when using other proportions, photoconductive products are obtained. It is often of advantage to use molar ratios of about 1:1. In most cases with the method described above, almost colorless resin-like substances are obtained which easily dissolve in organic polar solvents and which are capable of forming a coherent film. It is also possible to use mixtures of the respective reactants, i.e. mixtures of the amino component as well as mixtures of the acrolein component. By this method, a variety of photoconductive products is obtained.

Depending on the reaction conditions, such as temperature, solvent and kind and quantity of the condensing agent used, substances of different degrees of condensation are obtained. The preferred, relatively high molecular weight compounds of this kind can be applied to base materials as photoconductive layers without the use of binding agents.

In order to use the high polymeric reaction products described above as photoconductive layers for electrophotographic purposes, they are applied, advantageously after being dissolved in an organic solvent, onto a support, e.g., by casting, coating or spraying and then evaporating the solvent. The products can also be applied to the support in the form of dispersions in water or another dispersing agent.

The supports used can be those commonly employed in electrophotography. Preferred are foils made of metals, e.g. aluminum, zinc and copper; of cellulose products, such as paper, cellulose hydrate, and plastics, such as polyvinyl alcohol, polyamides, and polyurethanes; other plastics, such as cellulose acetate and cellulose butyrate, especially in a partially saponified form; polyesters, polycarbonates, and polyolefins, if they are covered with an electroconductive layer or if they are converted into materials which have a specific conductivity of at least $10^{-12}$ $ohm^{-1} \times cm.^{-1}$, e.g. by chemical treatment or by introduction of materials which render them electrically conductive. Glass plates may also be used.

The base material described above which, according to the present invention, has been coated with a thin coherent photoconductive layer of a uniform thickness is used for electrophotographically producing copies by charging the photoconductive layer, positively or negatively e.g. by means of a corona discharge from a charging device maintained at 6000 to 7000 volts. The electrophotographic material is then exposed to light in contact with a master, or by episcopic or diascopic projection of the master. An image corresponding to the master is thus produced on the base material and this invisible image is developed by contacting it with a developer powder consisting of carrier and toner. Suitable carriers are fine glass balls, iron powder or fine plastic balls. The toner consists of a resin-carbon black mixture or a colored resin. The toner is customarily used in a grain size of about 1–100μ. The developer may also consist of a resin or pigment suspended in a non-conductive liquid in which, if desired, resins have been dissolved. The image which has been made visible by development is fixed, e.g. by heating it with an infrared radiator to a temperature of 100–170° C., preferably 120–150° C., or by treatment with solvents, such as trichloroethylene, carbon tetrachloride, ethyl alcohol or steam. If a polarity of the electrical charge is used which is opposite to the polarity of the toner contained in the developer, images corresponding to the master characterized by good contrast effect are obtained. By changing the polarity of the corona discharge, it is possible to obtain reversal images with the same master and the same developer.

For transforming the electrophotographic images into printing plates, they are wiper over with a suitable solvent, rinsed with water and inked with greasy ink. Printing plates the thus obtained which may be clamped to an offset printing machine and used for printing.

If transparent supports are used, the electrophotographic images can also be used as masters for the production of additional copies on any type of layer. When using translucent supports for the photoconductive layers, such as are provided by the present invention, reflex images can also be produced.

The photoconductive layers of the present invention absorb light primarily within the ultraviolet range of the spectrum. The sensitivity of the photoconductive layers can be improved by the addition of activating substances such as organic compounds, which in molecular complexes of the donor-acceptor type (π-complexes, charge transfer complexes) can serve as electron acceptors. They are compounds of a high electron affinity and are acids, according to the definition of Lewis. Substances of such nature are those containing strongly polarizing residues or groups, such as the cyano group or nitro group; halides, such as fluorine, chlorine, bromine, iodine; the ketone group, the ester group, an acid anhydride or acid groups such as carboxylic groups or the quinone configuration. Such polarizing electron attracting groups are described by L. F. and M. Fieser in "Organic Chemistry," 2nd edition, 1950, page 604, Table I. Those substances are preferred which have a melting point above room temperature, viz. solid substances as, due to their low vapor pressure, they impart to the photoconductive layers a good storability. Moderately colored substances, such as quinones, can be used; however, it is preferred to use colorless or only weakly colored substances. The preferred maximum of absorption of the substances is within the ultraviolet range of the spectrum, i.e. below 4,500 A. Moreover, the activator substances to be used according to the present invention should be of low molecular weight, i.e. the molecular weight thereof should range between 50 and about 5000, preferably between about 100 and about 1000, since with the low molecular weight activators reproducible results, with respects to sensitivity can be obtained. Moreover, the sensitivity is maintained constant over a long time, as, contrary to the high molecular weight substances, the low molecular weight substances do not change substantially when stored.

Examples of such substances are:

| | |
|---|---|
| 2-bromo-5-nitro-benzoic acid | o-Chloro-nitrobenzene. |
| 2-bromo-benzoic acid | Chloro-acetophenone. |
| 2-chloro-toluene-4-sulphonic acid | 2-chloro-cinnamic acid. |
| Chloro-maleic acid anhydride | 2-chloro-4-nitro-1-benzoic acid. |
| 9-chloro-acridine | 2-chloro-5-nitro-1-benzoic acid. |
| 3-chloro-6-nitro-1-aniline | 3-chloro-6-nitro-1-benzoic acid. |
| 5-chloro-nitrobenzene-5-sulfochloride. | Phthalic acid anhydride. |
| 4-chloro-3-nitro-1-benzoic acid | Chloro-mucoic acid. |
| 4-chloro-2-hydroxy-benzoic acid | Bromo-mucoic acid. |
| 4-chloro-1-phenol-3-sulfonic acid | Styrene-dibromide. |
| 2-chloro-3-nitro-1-toluene-5-sulfonic acid. | Xylene tetra-bromide. |
| 4-chloro-3-nitro-benzene-phosphonic acid. | β,β,β-Trichloro-lactonitrile. |
| Dibromo-succinic acid | Triphenyl-chloro-methane. |
| 2,4-dichloro-benzoic acid | Tetrachloro phthalic acid. |
| Dibromo-maleic acid anhydride | Phthalic acid tetrabromide. |
| 9,10-dibromo anthracene | Phthalic acid tetra iodide. |
| 1,5-dichloro-naphthalene | Tetrachloro-phthalic aicd anhydride. |
| 1,8-dichloro-naphthalene | Tetrabromo-phthalic aicd anhydride. |
| 2,4-dinitro-1-chloro naphthalene | Tetraiodo-phthalic acid anhydride. |
| 3,4-dichloro-nitrobnezene | Tetrachloro-phthalic acid-monoethylester. |
| 2,4-dichloro-benzisatin | Tetrabromo-phthalic acid-monoethylester. |
| 2,6-dichloro-benzaldehyde | Tetraiodo-phthalic acid-monoethylester. |
| Hexabromo-naphthalic acid anhydride. | Iodoform. |
| bz-1-cyano-benzanthrone | Fumaric acid dinitrile. |
| Cyano-acetic acid | Tetra-cyano-ethylene. |
| 2-cyano-cinnamic acid | 1,3,5-tricyano-benzene. |
| 1,5-dicyano-naphthalene | |
| 3,5-dinitro-benzoic acid | 2,4-dinitro-1-chloro-naphthalene. |
| 3,5-dinitro-salicylic acid | 1,4-dinitro-naphthalene. |
| 2,4-dinitro-1-benzoic acid | 1,5-dinitro-naphthalene. |
| 2,4-dinitro-1-toluene-6-sulfonic acid. | 1,8-dinitro-naphthalene. |
| 2,6-dinitro-1-phenol-4-sulfonic acid | 2-nitrobenzoic acid. |
| 1,3-dinitro-benzene | 3-nitrobenzoic acid. |
| 4,4'-dinitro-diphenyl | 4-nitro-benzoic acid. |
| 3-nitro-4-methoxy-benzoic acid | 3-nitro-4-ethoxy-benzoic acid. |
| 4-nitro-1-methyl-benzoic acid | 3-nitro-2-cresol-5-sulfonic acid. |
| 6-nitro-4-methyl-1-phenol-2-sulfonic acid. | 5-nitro-barbituric acid. |
| 2-nitro-benzene-sulphinic acid | 4-nitro-acenaphthene. |
| 3-nitro-2-hydroxy-1-benzoic acid | 4-nitro-benzaldehyde. |
| 2-nitro-1-phenol-4-sulfonic acid | 4-nitro-phenol. |
| 4-nitro-1-phenol-2-sulfonic acid | Picric acid. |
| 3-nitro-N-butyl-carbazole | Picryl chloride. |
| 4-nitro-diphenyl | 2,4,7-trinitro-fluorenone. |
| Tetra-nitro-fluorenone | 1,3,5-trinitro-benzene. |
| 2,4,6-trinitro-anisol | |
| Anthraquinone | 1-chloro-2-methyl-anthraquinone. |
| Anthraquinone-2-carboxylic acid | Duroquinone. |
| Anthraquinone-2-aldehyde | 2,6-dichloro-quinone. |
| Anthraquinone-2-sulfonic acid-anilide. | 1,5-diphenoxy-anthraquinone. |
| Anthraquinone-2,7-disulfonic acid | 2,7-dinitro-anthraquinone. |
| Anthraquinone-2,7-disulfonic acid-bis-anilide. | 1,5-dichloro-anthraquinone. |
| Anthraquinone-2-sulfonic acid-dimethylamide. | 1,4-dimethyl-anthraquinone. |
| Acenaphthene-quinone | 2,5-dichloro-benzoquinone. |
| Anthraquinone-2-sulfonic acid-methylamide. | 2,3-dichloro-naphthoquinone-1,4. |
| Acenaphthene-quinone-dichloride | 1,5-dichloro-anthraquinone. |
| Benzoquinone-1,4 | 1-methyl-4-chloro-anthraquinone. |
| 1,2-benzanthraquinone | 2-methyl-anthraquinone. |
| Bromanil | Naphthoquinone-1,2. |
| 1-chloro-4-nitro-anthraquinone | Naphthoquinone-1,4. |
| Chloranil | Pentacene-quinone. |
| 1-chloro-anthraquinone | Tetracene-7,12-quinone. |
| Chrysene-quinone | 1,4-tolu-quinone. |
| Thymo-quinone | 2,5,7,10-tetrachloro-pyrene-quinone. |

The quantity of activator which is added to the photoconductors can be easily determined by simple experiments. It varies according to the substance used and usually amounts from about 0.1 to about 100 moles, preferably from about 1 to about 50 moles based on 1000 moles of photoconductive substance. Mixtures of several activator substances can also be used. Besides these substances the addition of dyestuff sensitizers is also possible.

By the addition of the activating substances, photoconductive layers can be produced which are highly light-sensitive, especially within the ultraviolet range and they are practically colorless. By means of these substances it is also possible to strongly activate the photoconductive layers within the ultraviolet range, whereupon a high sensitivity of the photoconductive layers within the range of visible light can be obtained by a very small addition of optical sensitizers, without so much of the dyestuff sensitizers being applied as to result in highly colored layers.

Even very small quantities of the dyestuff sensitizers, capable of extending the sensitivity of the layers from the ultraviolet range into the visible range of the spectrum, may be added. Additions of less than 0.01 percent of the dyestuff sensitizers are effective; in general, however, quantities of from 0.01 to 5 percent, preferably 0.05 to 3 percent, of the dyestuff sensitizers are added. Additions of larger quantities are possible but in this case no increase in sensitivity will generally be achieved. If the dyestuff sensitizers are used without the addition of activators, it will be advisable generally to use quantities approaching the upper limits stated above. In the presence of activators very small quantities of dyestuff sensitizers are effective.

The following substances may be listed as examples of dyestuff sensitizers which can be used with good or very good effect. They are taken from the "Farbstofftabellen" by Schultz, 7th edition, 1931, vol. 1:

Triarylmethane dyestuffs such as Brilliant Green (No. 760, page 314), Victoria Blue B (No. 822, page 347), Methyl Violet (No. 783, page 327), Crystal Violet (No. 785, page 329), Acid Violet 6B (No. 831, page 351); xanthene dyestuffs, namely rhodamines, such as Rhodamine B (No. 864, page 365), Rhodamine 6G (No. 866, page 366), Rhodamine G Extra (No. 865, page 366), Sulphorhodamine B (No. 863, page 364) and Fast Acid Eosin G (No. 870, page 368), as also phthaleins such as Eosin S (No. 883, page 375), Eosin A (No. 881, page 374), Erythrosin (No. 886, page 376), Phloxin (No. 890, page 378), Bengal Rose (No. 889, page 378), and Fluorescein (No. 880, page 373); thiazine dyestuffs such as Methylene Blue (No. 1038, page 449); acridine dyestuffs such as Acridine Yellow (No. 901, page 383), Acridine Orange (No. 908, page 387) and Trypaflavine (No. 906, page 386); quinoline dyestuffs such as Pinacyanol (No. 924, page 396) and Cryptocyanine (No. 927, page 397); cyanine dyestuffs, e.g. Cyanine (No. 921, page 394), and chlorophyll.

The photoconductive layers described above may be used in reproduction processes as well as in measuring techniques for recording purposes, e.g. photographic recorders. They are, however, also suitable for the production of other devices containing photoconductors, such as photoelectric cells, photoelectric resistors, and television receiver tubes. The photoconductive layers according to the present invention may be used in admixture with other photoconductors, with pigments, such as zinc oxide or titanium dioxide, or if desired with resins such as ketone resins. It is, however, one of their advantages that being high molecular weight, practically colorless substances, they can be applied to the supports in the form of homogeneous transparent layers, and they require no additional binding agent or other substances to be excellent photoconductive layers.

In the following examples are given the preferred methods for the preparation of the reaction products obtained from acrolein and amine compounds. The other compounds of this class may be prepared analogously. Variations in the working conditions, e.g. changes in the quantity of the solvent used corresponding to a changed solubility or other quantities of a condensation agent are within the knowledge of one skilled in the art.

For the preparation of the reaction product of acrolein and 4-amino-diphenyl, a hot solution of 16.9 parts by weight of the amine compound in 50 parts by volume of ethanol is mixed with 12 parts by volume of commercial acrolein and the mixture is boiled for a short time with reflux, the polymeric reaction product precipitating out. It is separated by filtration and purified by first dissolving it in methylene chloride and then adding petroleum ether to the solution.

The polymeric reaction products of acrolein and the other amine compounds are prepared analogously, with slight changes in the quantity of the solvent used or with the addition of glacial acetic acid.

The reaction with α-methyl acrolein is effected as follows: A solution of 14.5 parts by weight of 1-naphthylamine and 14 parts by volume of α-methyl acrolein in 30 parts by volume of methanol is heated for 10 minutes, with reflux, 5 parts by volume of glacial acetic acid are added and boiling is continued for 30 minutes. After cooling the precipitated polymeric reaction product is separated by filtration and purified by first dissolving it in methylene chloride and then reprecipitating it by the addition of petroleum ether to the solution. Other amine compounds may be prepared analogously.

In the following, the reaction of crotonaldehyde is described as an example of the reaction of a β-substituted acrolein. With vigorous agitation, 120 parts by weight of aniline are slowly added, drop by drop, to 112 parts by weight of crotonaldehyde, constantly cooling the reaction mixture so that the temperature does not exceed 50° C. Agitation is continued for about 3 hours at 50° C. whereupon the mixture is heated to about 125° C. under reduced pressure. During this process, the readily volatile substances are distilled off and a resin remains. By another method, the reaction may be performed in 500 parts by volume of ethanol, heating the reaction solution for 3 hours with reflux. Analogously, crotonaldehyde may be reacted with the other amine compounds stated above.

Mixed reaction products also may be prepared in a simple manner. A solution containing 14.3 parts by weight of 3-amino-9-ethyl-carbazole, and 28 parts by volume of α-methyl acrolein in 200 parts by volume of ethanol is heated for 10 minutes with reflux, 10 parts by volume of glacial acetic acid are added and boiling is continued for 60 minutes. By cooling the solution, complete precipitation of the reaction product is obtained. It is separated by filtration and purified by first dissolving it in methylene chloride and then reprecipitating it by adding petroleum ether to the solution.

The following table contains compounds which were prepared according to the method stated above. In this table, column 1 contains the aldehyde component, column 2 contains the amine compound used, column 3 contains the solvent used for the reaction mixture and columns 4 and 5 state the nitrogen content and the softening point of the polymeric reaction product obtained.

| 1 | 2 | 3 | 4 | 5 |
|---|---|---|---|---|
| Acrolein | Aniline | Ethanol | 7.7% N | 165° C. |
| Do | 4-dimethylaminoaniline | do | 13.4% N | 160° C. |
| Do | 4-amino-diphenyl | do | 5.9% N | 140° C. |
| Do | 1-amino-naphthalene | Methanol | 6.2% N | 165° C. |
| Do | 9-amino-anthracene | do | 5.1% N | 190° C. |
| Do | 2-amino-chrysene | Dioxane | 5.3% N | 170° C. |
| Do | 3-amino-pyrene | Ethanol | 4.9% N | 150° C. |
| Do | 4,4'-diaminostilbene | Dioxane | 8.6% N | >360° C. |
| Do | 2-amino-fluorene | Ethanol | 8.7% N | 198° C. |
| Do | 8-amino-quinoline | Methanol | 12.3% N | 205° C. |
| Do | 3-amino-9-ethylcarbazole | Ethanol | 10.0% N | 175° C. |
| Do | 2-amino-6-methoxybenzthioazole | Dioxane | 10.0% N | 56° C. |
| Do | 2-phenyl-4-(3'-amino-phenyl)-quinazoline. | do | 10.0% N | 140° C. |
| Do | 3-(4'-aminophenyl)-5,6-diphenyl-1,2,4-triazine. | Ethanol | 14.1% N | 185° C. |

| 1 | 2 | 3 | 4 | 5 |
|---|---|---|---|---|
| Acrolein | 2,5-bis-(4'-aminophenyl)-oxdiazole-(1,3,4). | Glycol-monomethyl-ether. | 12.3% N | >340° C. |
| α-Methyl-acrolein | 3-methoxy-aniline | Ethanol | 7.6% N | 100° C. |
| Do | 1-amino-naphthalene | Methanol | 6.2% N | 125° C. |
| Do | 4-amino-diphenyl | Ethanol | 6.4% N | 100° C. |
| Do | 2-amino-fluorene | do | 6.8% N | 55° C. |
| Do | 2-amino-6-methoxybenzthiazole | do | 11.0% N | 150° C. |
| Do | 4,4'-diamino-3,3'-dimethoxy-diphenyl | do | 7.2% N | 220° C. |
| Croton-aldehyde | Aniline | do | 8.8% N | 75° C. |
| Do | do | Ethanol | 9.0% N | 62° C. |
| Do | 1-amino-naphthalene | | 7.1% N | 45° C. |
| Acrolein | Aniline | | 9.9% N | 125° C. |
| α-Methyl-acrolein | 1-amino-naphthalene+3-amino-9-ethyl-carbazole. | Ethanol | 7.5% N | 210° C. |
| Acrolein | 2-amino-anthraquinone | Dioxane | 5.8% N | 320° C. |
| α-Ethyl-acrolein | 4-amino-diphenyl | Ethanol | 5.3% N | 144° C. |
| Do | 2,3-diamino-naphthalene | Methanol | 9.0% N | 150° C. |
| Do | 2-methyl-3-(3'-amino-phenyl)-quinazolone-(4). | Ethanol | 12.4% N | 160° C. |

Example 1

0.75 part by weight of the reaction product of 9.3 parts by weight of aniline and 12 parts by volume of commercial acrolein are dissolved in 15 parts by volume of chloroform and the solution is coated onto a superficially roughened aluminum surface. After evaporation of the solvent, a layer is formed which adheres firmly to the aluminum surface. By means of a corona discharge in a charging device maintained at about 6000 volts, the coated dry photoconductive layer is provided with a negative electric charge, then exposed under an original to the light of a high-pressure mercury lamp, and dusted over in known manner with a developer.

The developer consists of tiny glass balls and a very finely distributed resin-carbon black mixture. The black-colored resin adheres to those parts of the layer which were not struck by light during exposure. An image which corresponds to the master used becomes visible and is fixed by slight heating.

The developer used consists of 100 parts by weight of glass balls of a particle size ranging from 350 to 400μ and 2.5 parts by weight of a toner of a particle size of 20 to 50μ. The toner is prepared by melting together 30 parts by weight of polystyrene (Polystyrol LG), 30 parts by weight of a resin-modified maleic acid resin ("Beckacite" K-105) and 3 parts by weight of carbon black ("Peerless Black" Russ 552), and then grinding and sieving the solidified melt. The reaction product is prepared by dissolving 9.3 parts by weight of aniline in 30 parts by volume of ethanol, adding 12 parts by volume of commercial acrolein, and heating the mixture for 1 hour with reflux. The precipitating product is filtered, after cooling, then dissolved in methylene chloride and reprecipitated by adding petroleum ether to the solution. The reaction product thus obtained softens at 165° C. and has a nitrogen content of 7.7 percent.

Example 2

The method described in Example 1 is repeated using, instead of the reaction product of aniline and acrolein, the same quantity of the reaction product of 14.5 parts by weight of 1-naphthylamine and 14 parts by volume of α-methyl-acrolein, the preparation of which is described above.

Example 3

The process described in Example 1 is repeated using, instead of the solution in chloroform of the reaction product of aniline and acrolein, a solution of 0.75 part by weight of the reaction product of 120 parts by weight of aniline and 112 parts by weight of crotonaldehyde in 15 parts by volume of benzene. Very good positive electrophotographic images are obtained. The preparation of the reaction product is described above.

Example 4

4 parts by weight of after-chlorinated polyvinyl chloride ("Rhenoflex") are dissolved in a mixture consisting of 50 parts by volume of toluene and 40 parts by volume of methylethylketone. To this solution, there are added 4 parts by weight of the reaction product of 10.5 parts by weight of 4,4'-diaminostilbene and 6 parts by volume of commercial acrolein, and the suspension thus formed is very finely ground in a colloid mill. Paper which has been pretreated to prevent the penetration of organic solvents, e.g. according to one of U.S. Patents Nos. 2,534,650, 2,681,617 or 2,559,610, is coated with this suspension in a coating machine and then dried. The coated paper is used for the preparation of electrophotographic images in accordance with the method described in Example 1.

The reaction product mentioned above is prepared as follows: 10.5 parts by weight of 4,4'-diamino-stilbene and 6 parts by volume of commercial acrolein are heated, with reflux, in 150 parts by volume of dioxane, whereupon the reaction product spontaneously precipitates. After adding 2.5 parts by volume of glacial acetic acid, heating is continued for a short time. After filtration, the reaction product, which is insoluble in the usual organic solvents, is purified by boiling in dioxane and washing with alcohol.

Example 5

0.75 part by weight of the reaction product of 14.5 parts by weight of 1-naphthylamine and 14 parts by volume of α-methylacrolein are dissolved in 15 parts by volume of chloroform and the solution thus prepared is used for coating a paper base which has been pretreated to prevent the penetration of organic solvents. After evaporation of the solvent, the paper is electrically charged as described in Example 1 and then exposed under an original to the light of a 125 watt mercury lamp. Development, and fixation of the electrostatic image are performed as described in Example 1. A good electrostatic image of the original used is obtained, which shows no scumming. The preparation of the reaction product is described above.

Example 6

0.75 part by weight of the reaction product of 16.9 parts by weight of 4-aminodiphenyl and 14 parts by volume of α-methylacrolein are dissolved in 15 parts by volume of chloroform. To this solution there is added 0.03 part by weight of rhodamine B extra (Schultz' "Farbstofftabellen," 7th edition, vol. 1, No. 864), dissolved in 0.3 part by volume of methanol. The combined solution is coated onto paper which has been pretreated to prevent the penetration of organic solvents. After evaporation of the solvents, a homogeneous layer remains which adheres firmly to the paper surface. The coated paper is provided in known manner with a negative electrostatic charge and the thus sensitized paper is exposed under an original, e.g. for 3 seconds to the light of a 40 watt incandescent lamp at a distance of 25 cm. The exposed surface is dusted over with a resin powder colored by carbon black so that the latent electrostatic image becomes visible. The image is fixed, either by brief heating or by treatment with trichloroethylene vapors.

The reaction product is obtained by briefly boiling a solution containing 16.9 parts by weight of 4-amino-diphenyl and 14 parts by volume of α-methylacrolein in 30 parts by volume of ethanol. 5 parts by volume of glacial acetic acid are added and the mixture is heated for 30 minutes with reflux. After it has cooled, the crude product is separated by filtration and purified by first dissolving it in methylene chloride and then reprecipitating it by adding petroleum ether to the solution. It forms a colorless powder which has a nitrogen content of 6.4 percent.

*Example 7*

In accordance with the description contained in Example 6, an optically sensitized coating solution is prepared; this solution is coated onto opaque paper and dried. After the dried paper has been given a negative electric charge by means of a corona discharge, it is placed with its layer side against a book page printed on both sides and backed with black paper, and then exposed for 5 seconds to the light of a 40 watt incandescent lamp i.e. exposure is through the opaque paper base. After exposure, the latent reflex image is dusted over with a resin powder colored with carbon black; a mirror image of the original used is obtained. If paper or a plastic film is firmly pressed onto this mirror image, the image is transferred and a direct image of the original used appears on the paper or the plastic foil, respectively. For the preparation of the direct image an electric field may be applied, as known per se, to the paper or the film which is to accept the direct image. If transparent paper or film is used, intermediate originals are obtained which can be used for further reproduction, e.g. on blue printing paper.

*Example 8*

The coating solution described in Example 6 is prepared with the modification that no Rhodamine B extra is added, and this solution is used for coating paper which had been pretreated to prevent the penetration of organic solvents. The preparation and fixation of the electrophotographic image is performed as described in Example 1, with the exception that a 100 watt incandescent lamp is used for exposure. Time of exposure is 2 seconds at a distance of 25 cm. A good electrophotographic image of the original is obtained.

*Example 9*

0.75 part by weight of the reaction product of 10 parts by weight of 3-aminopyrene and 5 parts by volume of acrolein are dissolved in 15 parts by volume of chloroform, and the solution is coated onto transparent paper which had been pretreated to prevent the penetration of organic solvents. After evaporation of the solvent, the coated layer adheres firmly to the surface of the transparent paper. By means of an electrophotographic process, images with good contrast effect are produced on this layer, which can be used for further reproduction, e.g. on diazo printing paper. The reaction product mentioned above is prepared by boiling, for 5 minutes, 10 parts by weight of 3-amino-pyrene in 60 parts by volume of ethanol to which 5 parts by volume of commercial acrolein have been added; the reaction product precipitates. After adding 5 parts by volume of glacial acetic acid, the mixture is heated for 1 hour with reflux. After cooling, the precipitated reaction product is separated by filtration and purified by first dissolving it in methylene chloride and then reprecipitating it by the addition of petroleum ether to the solution. The reaction product forms a yellow powder which softens at 170° C. and has a nitrogen content of 5.3 percent.

*Example 10*

0.75 part by weight of the reaction product of 16.9 parts by weight of 4-aminodiphenyl and 12 parts by volume of acrolein are dissolved in 15 parts by volume of chloroform and the solution is coated onto a paper foil. The coated foil, which can be given a positive or a negative electric charge, is used for making electrophotographic images by the method described in Example 1. For exposure, a 100 watt incandescent lamp is used at a distance of 25 cm. The preparation of the reaction product is described above.

*Example 11*

0.4 part by weight of the reaction product obtained from 16.9 parts by weight of 4-aminodiphenyl and 12 parts by volume of acrolein, and 0.4 part by weight of the reaction product obtained from 10.5 parts by weight of 3-amino-9-ethyl-carbazole and 6 parts by volume of acrolein are dissolved in 15 parts by volume of chloroform. The solution is coated onto paper which had been pretreated to prevent the penetration of organic solvents. By the method described in Example 1, an electrophotographic image is prepared with the paper thus coated. The preparation of the first-mentioned reaction product is described above and the preparation of the latter reaction product is analogous thereto.

*Example 12*

1 part by weight of the reaction product of 9.3 parts by weight of aniline and 6.7 parts by volume of acrolein is dissolved in 15 parts by volume of chloroform. The solution is used for coating any paper base. With the paper thus coated an electrophotographic image is prepared as described in Example 1.

The reaction product just mentioned is obtained by boiling, for 10 minutes, a solution of 9.3 parts by weight of aniline and 6.7 parts by volume of acrolein in 30 parts by volume of ethanol. After adding 5 parts by volume of glacial acetic acid, the solution is heated for 1 hour with reflux. After cooling, the precipitating crude product is separated by filtration and purified by first dissolving it in methylene chloride and then reprecipitating it by adding petroleum ether to the solution. The reaction product has a nitrogen content of 8.6 percent.

*Example 13*

The method described in Example 12 is repeated using, instead of the reaction product of aniline and acrolein, the reaction product of 14.3 parts by weight of 1-naphthylamine and 6.7 parts by volume of acrolein, prepared, as described in Example 12, by heating in 30 parts by volume of methanol. The reaction product thus obtained has a nitrogen content of 6.5 percent.

*Example 14*

The method described in Example 12 is repeated using, instead of the reaction product employed in Example 12, 1 part by weight of the reaction product obtained from 14.3 parts by weight of 1-naphthylamine, 21 parts by weight of 3-amino-9-ethylcarbazole, and 28 parts by volume of α-methylacrolein. For the preparation of the reaction product, the 3 reaction components are heated for 10 minutes in 200 parts by volume of ethanol, 10 parts by volume of glacial acetic acid are added to the solution, and heating is continued, with reflux, for 1 hour. After the solution has cooled down, the precipitated reaction product is separated by filtration and purified by first dissolving it in methylene chloride and then reprecipitating it by adding petroleum ether to the solution. The reaction product thus obtained softens at 210° C. and has a nitrogen content of 7.5 percent.

*Example 15*

The method described in Example 1 is repeated, using a reaction product of aniline and acrolein which was prepared without the addition of a solvent. While externally cooling, 6.7 parts by volume of acrolein are added to 9.2 parts by weight of aniline and left standing for 30 minutes at room temperature. Subsequently, the mixture is heated for 1 hour over a steam bath. After cooling, the solid content of the flask is dissolved in methylene chloride, the solution is dried over calcium chloride, filtered and then introduced dropwise into petroleum ether. The compound thus obtained softens at 55° C. and has a nitrogen content of 9.9 percent.

*Example 16*

1 part by weight of the reaction product obtained from 17.1 parts by weight of 2-aminofluorene and 14 parts by volume of α-methylacrolein is dissolved, together with 0.0123 part by weight of chloranil, in 20 parts by volume of ethyleneglycol monomethylether. This solution is coated onto an aluminum foil and dried, and with the coated foil an electrophotographic image is prepared as described in Example 1. Time of exposure is reduced to ⅕ of that required for a layer containing no chloranil.

The reaction product mentioned above is prepared by heating, for 15 minutes, a solution of 17.1 parts by weight of 2-amino-fluorene and 14 parts by volume of α-methylacrolein in 200 parts by volume of ethanol, adding 5 parts by volume of glacial acetic acid, and subsequently heating again for 1 hour with reflux. The product, which precipitated during the heating process, is separated by filtration and purified by first dissolving it in methylene chloride and then reprecipitating it by adding petroleum ether to the solution. It forms a colorless powder which softens at 55° C. and has a nitrogen content of 6.8 percent.

*Example 17*

The method described in Example 16 is repeated replacing the 0.0123 part by weight of chloranil contained in the coating solution by 0.0126 part by weight of 1,2-dibromo-maleic acid anhydride. The exposure time is again reduced to ⅕ of the time required with a layer containing no 1,2-dibromo-maleic acid anhydride.

*Example 18*

0.5 part by weight of the reaction product of 15.8 parts by weight of 2,3-diaminonaphthalene and 35 parts by volume of α-ethyl-acrolein are dissolved in 10 parts by volume of benzene, and the solution is coated onto an aluminum foil and dried. Preparation of the electrophotographic image is as described in Example 1.

The compound used in the present example is prepared by dissolving 15.8 parts by weight of 2,3-diaminonaphthalene in 400 parts by volume of hot methanol, adding 35 parts by volume of α-ethyl-acrolein, boiling up, and heating for 1 hour with reflux after adding 5 parts by volume of glacial acetic acid, whereupon the compound precipitates. After the solution has cooled, the reaction product is separated by filtration and boiled in methanol for purification. It forms a yellow amorphous powder which begins to soften at 150° C. and has a nitrogen content of 9.0 percent.

It will be obvious to those skilled in the art that many modifications may be made within the scope of the present invention without departing from the spirit thereof, and the invention includes all such modifications.

What is claimed is:

1. An electrophotographic material comprising a conductive support layer and a photoconductive insulating layer, the latter comprising at least one compound selected from the group consisting of optical sensitizers and activators in admixture with the polymeric reaction product of at least one organic compound selected from the group consisting of aromatic and heterocyclic compounds having an amino group attached to a ring carbon atom, with an acrolein.

2. An electrophotographic material comprising a conductive support layer and a photoconductive insulating layer, the latter comprising the polymeric reaction product of aniline and acrolein.

3. An electrophotographic material comprising a conductive support layer and a photoconductive insulating layer, the latter comprising at least one compound selected from the group consisting of optical sensitizers and activators in admixture with the polymeric reaction product of 1-naphthylamine and α-methylacrolein.

4. An electrophotographic material comprising a conductive support layer and a photoconductive insulating layer, the latter comprising at least one compound selected from the group consisting of optical sensitizers and activators in admixture with the polymeric reaction product of 4,4'-diaminostilbene and acrolein.

5. An electrophotographic material comprising a conductive support layer and a photoconductive insulating layer, the latter comprising at least one compound selected from the group consisting of optical sensitizers and activators in admixture with the polymeric reaction product of 4-aminodiphenyl and α-methylacrolein.

6. An electrophotographic material comprising a conductive support layer and a photoconductive insulating layer, the latter comprising at least one compound selected from the group consisting of optical sensitizers and activators in admixture with the polymeric reaction product of 3-aminopyrene and acrolein.

7. An electrophotographic material comprising a conductive support layer and a photoconductive insulating layer, the latter comprising at least one compound selected from the group consisting of optical sensitizers and activators in admixture with the polymeric reaction product of 4-aminodiphenyl and acrolein.

8. An electrophotographic material comprising a conductive support layer and a photoconductive insulating layer, the latter comprising at least one compound selected from the group consisting of optical sensitizers and activators in admixture with the polymeric reaction product of 1-naphthylamine and acrolein.

9. An electrophotographic material comprising a conductive support layer and a photoconductive insulating layer, the latter comprising at least one compound selected from the group consisting of optical sensitizers and activators in admixture with the polymeric reaction product of 1-naphthylamine, 3-amino-9-ethyl-carbazole, and α-methylacrolein.

10. An electrophotographic material comprising a conductive support layer and a photoconductive insulating layer, the latter comprising at least one compound selected from the group consisting of optical sensitizers and activators in admixture with the polymeric reaction product of 2-aminofluorene and α-methylacrolein.

11. An electrophotographic material comprising a conductive support layer and a photoconductive insulating layer, the latter comprising at least one compound selected from the group consisting of optical sensitizers and activators in admixture with the polymeric reaction product of 2,3-diaminonaphthalene and α-ethylacrolein.

12. A photographic reproduction process which comprises exposing an electrostatically charged, supported, photoconductive insulating layer to light under a master and developing the resulting image with an electroscopic material, the photoconductive layer comprising the polymeric reaction product of at least one organic compound selected from the group consisting of aromatic and heterocyclic compounds having an amino group attached to a ring carbon atom, with an acrolein.

13. A photographic reproduction process which comprises exposing an electrostatically charged, supported, photoconductive insulating layer to light under a master and developing the resulting image with an electroscopic material, the photoconductive layer comprising the polymeric reaction product of aniline and acrolein.

14. A photographic reproduction process which comprises exposing an electrostatically charged, supported, photoconductive insulating layer to light under a master and developing the resulting image with an electroscopic material, the photoconductive layer comprising the polymeric reaction product of 1-naphthylamine and α-methylacrolein.

15. A photographic reproduction process which comprises exposing an electrostatically charged, supported, photoconductive insulating layer to light under a master and developing the resulting image with an electroscopic material, the photoconductive layer comprising the polymeric reaction product of 4,4'-diaminostilbene and acrolein.

16. A photographic reproduction process which comprises exposing an electrostatically charged, supported, photoconductive insulating layer to light under a master and developing the resulting image with an electroscopic material, the photoconductive layer comprising the polymeric reaction product of 4-aminodiphenyl and α-methylacrolein.

17. A photographic reproduction process which comprises exposing an electrostatically charged, supported, photoconductive insulating layer to light under a master and developing the resulting image with an electroscopic material, the photoconductive layer comprising the polymeric reaction product of 3-aminopyrene and acrolein.

18. A photographic reproduction process which comprises exposing an electrostatically charged, supported, photoconductive insulating layer to light under a master and developing the resulting image with an electroscopic material, the photoconductive layer comprising the polymeric reaction product of 4-aminodiphenyl and acrolein.

19. A photographic reproduction process which comprises exposing an electrostatically charged, supported, photoconductive insulating layer to light under a master and developing the resulting image with an electroscopic material, the photoconductive layer comprising the polymeric reaction product of 1-naphthylamine and acrolein.

20. A photographic reproduction process which comprises exposing an electrostatically charged, supported, photoconductive insulating layer to light under a master and developing the resulting image with an electroscopic material, the photoconductive layer comprising the polymeric reaction product of 1-naphthylamine, 3-amino-9-ethyl-carbazole, and α-methylacrolein.

21. A photographic reproduction process which comprises exposing an electrostatically charged, supported, photoconductive insulating layer to light under a master and developing the resulting image with an electroscopic material, the photoconductive layer comprising the polymeric reaction product of 2-aminofluorene and α-methylacrolein.

22. A photographic reproduction process which comprises exposing an electrostatically charged, supported, photoconductive insulating layer to light under a master and developing the resulting image with an electroscopic material, the photoconductive layer comprising the polymeric reaction product of 2,3-diaminonaphthalene and α-ethylacrolein.

References Cited in the file of this patent

UNITED STATES PATENTS

| | | |
|---|---|---|
| 2,377,868 | D'Alelio | June 12, 1945 |
| 2,477,462 | McQueen | July 26, 1949 |
| 2,495,890 | Danforth | Jan. 31, 1950 |
| 2,935,493 | Schuller et al. | May 3, 1960 |
| 2,953,546 | Thomas | Sept. 20, 1960 |
| 2,954,291 | Clark | Sept. 27, 1960 |
| 2,962,376 | Schaffert | Nov. 29, 1960 |

FOREIGN PATENTS

| | | |
|---|---|---|
| 562,336 | Belgium | May 13, 1958 |

OTHER REFERENCES

Ellis: The Chemistry of Synthetic Resins, vol. I, Reinhold (1935), pages 686–704.